United States Patent [19]

Ota et al.

[11] Patent Number: 5,543,126
[45] Date of Patent: Aug. 6, 1996

[54] PROCESS FOR PREPARING CRYSTALLINE CERIC OXIDE

[75] Inventors: Isao Ota; Tohru Nishimura, both of Funabushi, Japan

[73] Assignee: Nissan Chemical Industries, Ltd., Tokyo, Japan

[21] Appl. No.: 490,612

[22] Filed: Jun. 15, 1995

[30] Foreign Application Priority Data

Jul. 11, 1994 [JP] Japan .................... 6-158479

[51] Int. Cl.⁶ .................................................. C01F 17/00
[52] U.S. Cl. .................................... 423/263; 252/352
[58] Field of Search .......................... 423/592, 263

[56] References Cited

U.S. PATENT DOCUMENTS

| | | | |
|---|---|---|---|
| 4,965,057 | 10/1990 | David et al. | 423/263 |
| 5,389,352 | 2/1995 | Wang | 423/263 |
| 5,433,878 | 7/1995 | Arai et al. | 423/594 |

FOREIGN PATENT DOCUMENTS

| | | | |
|---|---|---|---|
| 300852 | 1/1989 | European Pat. Off. | 423/592 |

*Primary Examiner*—Wayne Langel
*Attorney, Agent, or Firm*—Oblon, Spivak, McClelland, Maier & Neustadt, P.C.

[57] ABSTRACT

The present invention is to provide a process for preparing ceric oxide particles used as an abrasive or polishing material for producing semiconductors or as a UV ray-absorbing material for plastics, glass and the like.

The present invention relates to a process for preparing cerium (IV) oxide particles having a particle size of from 0.03 µm to 5 µm, which comprises adjusting an aqueous medium containing cerium (IV) hydroxide and a nitrate to a pH of from 8 to 11 with an alkaline substance and heating the aqueous medium at a temperature of from 100° to 200° C. under pressure.

7 Claims, No Drawings

PROCESS FOR PREPARING CRYSTALLINE CERIC OXIDE

BACKGROUND OF THE INVENTION

1. Field of the Invention

The present invention relates to a process for preparing crystalline ceric oxide particles used as an abrasive or polishing material for producing semiconductors or as a UV ray-absorbing material for plastics, glass and the like.

2. Discussion of the Invention

A crystalline ceric oxide is known to have an excellent abrasive properties as compared with a silica type abrasive or polishing material.

Japanese Examined Patent Publication No. 2582/1994 discloses a process for producing crystalline ceric oxide particles having a particle size of not more than 300 Å, which comprises reacting a cerium salt with an alkali metal hydroxide or ammonia to obtain a gel-like material, filtrating the gel-like material, washing to remove impurities present in the gel-like material, adding an acid thereto and subjecting it to hydrothermal treatment.

Japanese Laid Open Patent Publication No. 502656/1988 discloses a process for producing rare earth element oxide particles having a particle size of from 0.05 to 10μ, which comprises dissolving a rare earth element compound in a liquid medium and maintaining the liquid medium in a sealed container at less than the critical temperature under the critical pressure of the medium, preferably at a temperature of from 200° to 600° C. under a pressure of at least 40 atmospheric pressures (atms).

The process of Japanese Examined Patent Publication No. 2582/1994 forms a gel by reacting a cerium salt with an alkaline substance, and this reference discloses that it is necessary to conduct filtration and washing for removing impurities present in the gel thus formed. This reference also discloses that the sol thus obtained becomes unstable if the filtration and the washing are not conducted and the cited invention can not be completed. However, in the process comprising a series of steps including hydrothermal treatment, it is unfavorable for production efficiency to employ filtration and washing steps during the production.

The process of Japanese Laid Open Patent Publication No. 502656/1988 requires a large scale of reaction apparatus since the liquid medium having a rare earth element compound dissolved is hydrothermally treated at a high temperature of 200° to 600° C. under a high pressure of at least 40 atms. Usually, a material used for producing the reaction apparatus is stainless steel, but when the above-mentioned hydrothermal treatment is conducted under a condition containing a corrosive material, there is raised such a problem that impurities derived from the material of the reaction apparatus are incorporated into a product.

SUMMARY OF THE INVENTION

The present invention is to provide a process for efficiently preparing crystalline ceric oxide particles without raising the above-mentioned conventional problems.

That is, the present invention is to provide a process for preparing cerium (IV) oxide particles having a particle size of from 0.03 to 5μ, which comprises adjusting an aqueous medium containing cerium (IV) hydroxide and a nitrate to a pH of from 8 to 11 with an alkaline substance and heating the aqueous medium at a temperature of from 100° to 200° C. under pressure.

DETAILED DESCRIPTION OF THE INVENTION

Ceric hydroxide used in the present invention is defined by the chemical formula, $Ce(OH)_4 \cdot nH_2O$ (n=0, 1.0, 1.5 or 2.0), and is used alone or in a mixture.

An aqueous medium used in the present invention is usually water, but a mixed medium having a small amount of a water-soluble organic solvent mixed with water or having a minor amount of impurities such as an alkali metal or an alkali earth metal mixed therewith, may be used.

The ceric hydroxide used herein may be a commercially available ceric hydroxide or may be one synthesized from a cerium salt. The synthesized ceric hydroxide may be prepared by a method of adding an alkaline substance to a cerium (IV) salt in an aqueous medium or by a method of converting a cerium (III) salt into a cerium (IV) salt in an aqueous medium with an oxidizing agent such as hydrogen peroxide and adding an alkaline substance to the aqueous medium to form ceric hydroxide. Examples of the cerium (IV) salt used in the above reaction to form ceric hydroxide from the cerium salt include ceric nitrate, ceric chloride, ceric sulfate, cerium (IV) ammonium nitrate and the like, but particularly preferable example is ceric nitrate. Examples of the cerium (III) salt include cerous nitrate, cerous chloride, cerous sulfate, cerous carbonate, cerium (III) ammonium nitrate and the like, but particularly preferable example is cerous nitrate. The above illustrated cerium salts may be used respective alone or in a mixture. Furthermore, examples of the alkaline substance include an alkali metal hydroxide such as lithium hydroxide, sodium hydroxide and potassium hydroxide, ammonia, amine, quaternary ammonium hydroxide and the like, but particularly preferable examples include ammonia, sodium hydroxide and potassium hydroxide. They may be used respectively alone or in a mixture. In the method for synthesizing ceric hydroxide from a cerium salt, when cerium nitrate is used as a starting material, ceric hydroxide and a nitrate are formed in an aqueous medium by reaction, and therefore the aqueous medium containing the ceric hydroxide and the nitrate thus formed is used as it is in the process of the present invention.

In the present invention, it is preferable to use ceric hydroxide and a nitrate in a molar ratio of $[NO_3^-]/[Ce^{4+}]=$ from 1 to 6, particularly from 3 to 5. Examples of the nitrate include ammonium nitrate, lithium nitrate, sodium nitrate and potassium nitrate. Preferable examples include ammonium nitrate, sodium nitrate and potassium nitrate, and they may be used alone or in a mixture.

According to the present invention, ceric oxide particles can be prepared by subjecting the above-mentioned ceric hydroxide and nitrate to hydrothermal reaction. The above-mentioned ceric hydroxide and nitrate to be subjected to hydrothermal treatment are contained in an aqueous medium at the total concentration of from 0.01 to 65% by weight, preferably from 1.0 to 50% by weight. The, above hydrothermal reaction is conducted by adjusting the aqueous medium containing ceric hydroxide and nitrate at a pH of from 8 to 11, preferable from 8.5 to 10, and heating the aqueous medium thus adjusted. The adjustment of pH is conducted by adding an alkaline substance to the aqueous medium. Examples of the alkaline substance include an alkali metal hydroxide such as lithium hydroxide, sodium hydroxide and potassium hydroxide, ammonia, amine, quaternary ammonium hydroxide and the like, preferably ammonia, sodium hydroxide and potassium hydroxide, and they may be used alone or in a mixture. In the above hydrothermal reaction, temperature of the aqueous medium is preferably made from 100° to 200° C., and the pressure is made from 1 to 30 kg/cm², particularly from 1 to 15 kg/cm². This pressure may be obtained by applying an external pressure, but may also be obtained by spontaneous vapor pressure of the aqueous medium. Also, the reaction time is generally from 1 to 100 hours, preferably from 5 to 50 hours.

A reaction apparatus used in the above hydrothermal reaction is preferably an autoclave having a Teflon resin or glass inner wall or an autoclave applied with glass lining treatment. This autoclave may be used in a sealed system, but may also be used in a flowing system in order to raise production efficiency.

Ceric oxide particles obtained in the above hydrothermal reaction are taken out from an autoclave as a slurry, and the ceric oxide particles can be separated by a filter. At this time, the slurry containing ceric oxide particles taken out from the autoclave has a pH of from 0.5 to 10.5, and the ceric oxide concentration is from 0.005 to 25% by weight, preferably from 0.4 to 20% by weight. The separation of the ceric oxide particles can be efficiency conducted by passing the slurry through a filter by using an internal pressure in the autoclave. The ceric oxide particles thus separated may be washed to remove impurities deposited on the particles.

Ceric oxide particles obtained in the present invention usually have a particle size of from 0.03 to 5μ and a specific surface area of at most 100 cm²/g. When the ceric oxide particles are used as an abrasive or polishing material, they should preferably have a particle size of from 0.05 to 5μ, and when the ceric oxide particles are used as a UV ray-absorbing material, they should preferably have a particle size of from 0.03 to 0.05μ. The above particle size can be measured by a particle distribution-measuring apparatus employing centrifugal sedimentation system, and the specific surface area can be measured by gas adsorption method (BET method). When the above ceric oxide particles were dried at 110° C. and subjected to X-ray diffraction analysis, diffraction angles (2θ) had the main peaks at 28.6°, 47.5° and 56.4° and the ceric oxide particles obtained in the present invention were proved to be highly crystalline ceric oxide particles of a crystal of cubic crystal system as defined in "34–394" of ASTM Card. Also, the above ceric oxide particles were observed by a transmission electron microscope and were proved to be a polycrystal particle having a particle size of from 0.03 to 5μ obtained by chemically bonding ceric oxide fine particles having an average particle size of from 20 to 60 nm. Furthermore, it was proved that these particles having a particle size of from 0.03 to 5μ were not divided to finer particles of smaller than 30 nm even by dispersing these particles in an aqueous medium by applying mechanical external force.

According to the present invention, the slurry withdrawn from the autoclave may be washed and concentrated by ultrafiltration method to prepare an abrasive or polishing liquid containing ceric oxide particles. The concentration of the ceric oxide particles can be concentrated to from 10 to 50% by weight in the slurry by this ultrafiltration method.

Also, the ceric oxide particles obtained in the present invention can be redispersed in an aqueous medium or a mixture solvent of water and a water-soluble organic solvent to prepare a slurry of ceric oxide particles which is usable as an abrasive or polishing liquid.

The abrasive or polishing liquid obtained by the above ultrafiltration method or redispersion method can be adjusted so as to contain ceric oxide particles at a concentration of from 10 to 50% by weight at a pH of from 3 to 10. When the abrasive or polishing liquid containing ceric oxide particles obtained in the present invention is allowed to stand for a long time, a part of the particles is sedimented but is easily redispersed by stirring and returned to the original state. Thus, the abrasive or polishing liquid of the present invention can be stably stored at room temperature for at least 1 year.

The aqueous dispersion of crystalline ceric oxide particles having a particle size of from 0.03 to 5μ withdrawn from an autoclave in accordance with the present invention can be formed into a sol having ceric oxide particles stably dispersed in an aqueous medium by incorporating a quaternary ammonium ion ($NR_4^+$, R=an alkyl group) into the aqueous medium as a stabilizer in a molar ratio of $(NR_4^+)/(CeO_2)=$ from 0.001 to 1. The incorporation of quaternary ammonium ion can be conducted by washing and concentrating the aqueous dispersion by ultrafiltration method and then adding a quaternary ammonium hydroxide such as tetramethylammonium hydroxide, tetraethylammonium hydroxide or the like. The ceric oxide sol thus prepared contains crystalline ceric oxide particles at a solid content of from 0.005 to 25% by weight and has a pH of from 9.0 to 13.5. The ceric oxide sol stabilized by the quaternary ammonium ion is adjusted to a desired concentration, and can be used as an abrasive or polishing liquid for a silica insulating film or an organic resin film in the production of a silicon semiconductor or a compound semiconductor.

The present invention is to produce ceric oxide particles by conducting hydrothermal reaction of ceric hydroxide and a nitrate in an alkaline aqueous medium.

In the present invention, the ceric oxide particles can not be obtained when using a chloride, a sulfate or a carbonate in place of the nitrate. The nitrate has a function of controlling particle growth of particles formed in the hydrothermal reaction. However, if the molar ratio of $[NO_3^-]/[Ce^{4+}]$ in an aqueous medium is less than 1, particle size grows unpreferably larger than 5μ, while if the above molar ratio exceeds 6, particle size becomes unpreferably smaller than 0.03μ.

In the present invention, the alkaline substance added to adjust the pH of the aqueous medium to from 8 to 11 has a function of promoting particle growth of particles formed in the hydrothermal reaction. However, if the pH value is less than 8, the yield of ceric oxide formed becomes unfavorably low, while if the pH value exceeds 11, the particle size becomes unfavorably larger than 5μ.

In the present invention, if the hydrothermal reaction temperature is less than 100° C., the yield of ceric oxide particles becomes poor, and the crystallinity of the particles thus formed also becomes poor. On the other hand, the hydrothermal reaction can be conducted at a temperature more than 200° C., but if the reaction temperature exceeds 200° C., stainless steel is employed as a material for an autoclave in view of heat resistance. However, the stainless steel is sometimes corroded during hydrothermal reaction at such a high temperature under a high pressure, thereby eluting impurities such as iron, chromium, nickel, cobalt or their compounds in the aqueous medium. And the impurities thus eluted contaminate ceric oxide particles to be formed and provide chemically bad influence thereto. However, in the present invention, the hydrothermal reaction is conducted at a temperature of from 100° to 200° C., and it is therefore possible to employ an autoclave reactor having a Teflon resin or glass inner wall or an autoclave applied with glass lining treatment.

In the present invention, if the reaction pressure is less than 1 kg/cm², the reaction proceeds at an unfavorably low rate. On the other hand, it is possible to conduct the reaction under such a high pressure as exceeding 30 kg/cm² but in such a case, it is necessary to employ a stainless steel-made reactor in view of pressure resistance, and the same problems as mentioned above are raised.

Also, if the particle size of ceric oxide particles obtained in the present invention is smaller than 0.03μ, abrasing or polishing performance becomes unfavorably low when they are used in a slurry as an abrasive or polishing material. On the other hand, if the particle size exceeds 5μ, particles in the slurry are sedimented and coagulated to such a degree as to be hardly dispersed again.

EXAMPLES

Example 1

3.0 g of ceric hydroxide and 4.6 g of ammonium nitrate were dispersed in 80 g of pure water. The aqueous solution thus obtained contained ceric hydroxide and ammonium nitrate in a molar ratio of $[NO_3^-]/[Ce^{4+}]=4$. This aqueous solution was adjusted with 10% aqueous ammonia so as to have a pH of 7.7, and was charged into a Teflon-made 120 ml-autoclave, and hydrothermal reaction was conducted at a temperature of 180° C. under a pressure of 10 kg/cm² for 15 hours. After completing the reaction, the autoclave was returned to conditions of room temperature and atmospheric pressure, thus obtaining a slurry of pH 7.2 containing light yellow particles.

The particles thus obtained were taken out from the slurry by filtration and were washed with pure water. Thereafter, the average particle size of the particles thus obtained was measured by a particle distribution-measuring apparatus employing centrifugal sedimentation system (SA-CP3 manufactured by Shimadzu Seisakusho K. K.) and was proved to be 0.33μ. The yield of ceric oxide particles thus obtained was 100%.

Also, when the particles thus obtained were dried and subjected to X-ray diffraction analysis (JDX-8200T manufactured by Nihon Denshi K. K.), diffraction angles (2θ) had the main peaks at 28.6°, 47.5° and 56.4° and the particles were proved to correspond to the characteristic peak of ceric oxide crystal of cubic crystal system as defined in "34–394" of ASTM Card. Also, the ceric oxide particles thus obtained were analyzed to detect impurities contained therein, but no metal element was detected other than cerium. Furthermore, after degassing at 290° C., the ceric oxide particles were subjected to a specific surface-measuring apparatus ("Monosorb" manufactured by Yuasa Ionics K. K.) and were proved to have a specific surface area of 71 m²/g.

Example 2

43.3 g of cerous nitrate and 200 g of pure water were placed in a beaker, and were heated to boiling state with stirring. Thereafter, 29 g of 35% hydrogen peroxide was gradually added thereto without causing bumping to oxidize cerium (III) salt to cerium (IV) salt. This aqueous solution thus obtained was cooled, and 18 g of 28% aqueous ammonia was added thereto in such a manner as to be a molar ratio of $[NH_4OH]/[Ce^{4+}]=3$ and to adjust the aqueous solution to a pH of 9.0. In this manner, a slurry containing colloid-like precipitates of ammonium nitrate and cerium (IV) hydroxide in a molar ratio of $[NO_3^-]/[Ce^{4+}]=3$.

85 g of the slurry thus obtained was placed in a Teflon-made 120 ml-autoclave, and was subjected to hydrothermal treatment at a temperature of 150° C. under a pressure of 5 kg/cm² for 15 hours. After completing the reaction, the autoclave was returned to conditions of room temperature and atmospheric pressure, thus producing a slurry of pH 1.6 containing light yellow particles.

The particles thus obtained were filtrated out from the slurry, and were washed with pure water. The particles thus obtained were analyzed in the same manner as in Example 1, and were proved to be highly crystalline ceric oxide particles having an average particle size of 0.54μ. The yield of the ceric oxide particles thus obtained was 100%. Also, according to impurity analysis, no metal element was detected other than cerium.

Example 3

43.3 g of cerous nitrate and 200 g of pure water were placed in a beaker, and were heated to boiling state with stirring. Thereafter, 40 g of 35% hydrogen peroxide was gradually added thereto without causing bumping to oxidize cerium (III) salt to cerium (IV) salt. After cooling this aqueous solution, 24 g of 28% aqueous ammonia was added thereto while stirring in such a manner as to provide a molar ratio of $[NH_4OH]/[Ce^{4+}]=4$ and to adjust the aqueous solution to a pH of 9.5. In this manner, a slurry containing colloid-like precipitates of ammonium nitrate and cerium (IV) hydroxide in a molar ratio of $[NO_3^-]/[Ce^{4+}]=3$ was obtained.

85 g of the slurry thus obtained was placed in a Teflon-made 120 ml-autoclave, and was subjected to hydrothermal treatment at a temperature of 180° C. under a pressure of 10 kg/cm² for 15 hours. After completing the reaction, the autoclave was returned to conditions of room temperature and atmospheric pressure to obtain a slurry of pH 9.4 containing light yellow particles.

The particles thus obtained were filtrated out from the slurry, and were washed with pure water. Thereafter, the particles thus obtained were analyzed in the same manner as in Example 1 and were proved to be highly crystalline ceric oxide particles having an average particle size of 0.53μ. The yield of the ceric oxide particles thus obtained was 100%.

Example 4

433 g of cerous nitrate and 2000 g of pure water were placed in a beaker, and were heated to boiling state with stirring. Thereafter, 290 g of 35% hydrogen peroxide was gradually added thereto without causing bumping to oxidize cerium (III) salt to cerium (IV) salt. The aqueous solution thus obtained was cooled, and 182 g of 28% aqueous ammonia was added thereto with stirring in such a manner as to be a molar ratio of $[NH_4OH]/[Ce^{4+}]=3$ and to adjust the aqueous solution to a pH of 8.7. In this manner, a slurry containing colloid-like precipitates of ammonium nitrate and cerium (IV) hydroxide in a molar ratio of $[NO_3^-]/[Ce^{4+}]=3$ was obtained.

The slurry thus obtained was placed in a glass-made 3 l-autoclave, and was subjected to hydrothermal treatment at a temperature of 170° C. under a pressure of 8 kg/cm² for 33 hours. After completing the reaction, the autoclave was returned to conditions of room temperature and atmospheric pressure, thus obtaining a slurry of pH 1.3 containing light yellow particles.

The particles thus obtained were filtrated out from the slurry, and were washed with pure water. The particles thus obtained were subjected to analysis in the same manner as in Example 1, and were proved to be highly crystalline ceric oxide particles having an average particle size of 0.29μ. The yield of the ceric oxide particles thus obtained was 99%.

The slurry thus obtained was washed and concentrated by an ultrafiltration apparatus to obtain a slurry of pH 5.0 containing crystalline ceric oxide particles at a solid content of 20% by weight. When this slurry was allowed to stand for a long time, a part of particles was sedimented, and it is therefore necessary to redisperse by stirring at the time of using.

Also, the slurry of crystalline ceric oxide particles was analyzed in respect of abrasive or polishing properties to silica glass, and was proved to have a polishing rate almost 2 times higher than a commercially available silica sol abrasive or polishing material.

Example 5

43.3 g of cerous nitrate and 200 g of pure water were placed in a beaker, and were heated to boiling state with stirring. Thereafter, 29 g of 35% hydrogen peroxide was gradually added thereto without causing bumping to oxidize cerium (III) salt to cerium (IV) salt. The aqueous solution thus obtained was cooled, and 24 g of 28% aqueous ammonia was added thereto with stirring in such a manner as to be a molar ratio of $[NH_4OH]/[Ce^{4+}]=4$ and to adjust the aqueous solution to a pH of 8.9. In this manner, a slurry containing colloid-like precipitates of ammonium nitrate and cerium (IV) hydroxide in a molar ratio of $[NO_3]/[Ce^{4+}]=3$ was obtained.

The colloid-like precipitates were separated and washed with pure water, and was then redispersed to obtain a slurry of pH 8.5. 85 g of the slurry thus obtained was placed in a Teflon-made 120 ml-autoclave, and was subjected to hydrothermal treatment at a temperature of 180° C. under a pressure of 10 kg/cm² for 15 hours. After completing the reaction, the autoclave was returned to conditions of room temperature and atmospheric pressure to obtain a slurry of pH 1.6 containing light yellow particles.

The particles thus obtained were filtrated out from the slurry, and were washed with pure water. Thereafter, the particles thus obtained were subjected to analysis in the same manner as in Example 1, and were proved to be highly crystalline ceric oxide particles having an average particle size of 0.09μ. The yield of the ceric oxide particles thus obtained was 88%.

Example 6

433 g of cerous nitrate and 2000 g of pure water were placed in a beaker, and were heated to boiling state with stirring. Thereafter, 290 g of 35% hydrogen peroxide was gradually added thereto without causing bumping to oxidize cerium [III] salt to cerium (IV) salt. The aqueous solution thus obtained was cooled, and 213 g of 28% aqueous ammonia was added thereto in such a manner as to be a molar ratio of $[NH_4OH]/[Ce^{4+}]=3.5$ and to adjust the aqueous solution to a pH of 8.9. In this manner, a slurry containing colloid-like precipitates of ammonium nitrate and cerium (IV) hydroxide in a molar ratio of $[NO_3]/[Ce^{4+}]=3$. The slurry thus obtained was placed in a glass-made 3 l-autoclave, and was subjected to hydrothermal treatment at a temperature of 150° C. under a pressure of 6 kg/cm² for 20 hours. After completing the reaction, the autoclave was returned to conditions of room temperature and atmospheric pressure to obtain a slurry of pH 8.5 containing light yellow fine particles. The fine particles thus obtained were filtrated out from the reaction liquor and were washed. Thereafter, the particles thus obtained were analyzed in the same manner as in Example 1 and were proved to be crystalline ceric oxide particles having an average particle size of 0.26μ. The slurry thus obtained was washed and concentrated by an ultrafiltration apparatus to obtain an aqueous dispersion of FH 5.5 containing crystalline ceric oxide at a solid content of 20% by weight. To the aqueous dispersion thus obtained, was added tetramethylammonium hydroxide aqueous solution in a molar ratio of $[N(CH_3)_4^+]/(CeO_2)=0.02$ to obtain a stable aqueous sol of pH 11.9 containing crystalline ceric oxide particles.

The aqueous sol of crystalline ceric oxide was excellent as an abrasive or polishing liquor used for producing semiconductors.

Comparative Example 1

3.0 g of ceric hydroxide and 4.6 g of ammonium nitrate were dispersed in 80 g of pure water to obtain an aqueous solution containing ceric hydroxide and ammonium nitrate in a molar ratio of $[NO_3^-]/[Ce^{4+}]=4$. The aqueous solution thus prepared was adjusted to a pH of 11.7 with a 10% by weight sodium hydroxide aqueous solution, and was placed in a Teflon-made 120 ml-autoclave and was subjected to hydrothermal treatment at a temperature of 180° C. under a pressure of 10 kg/cm² for 15 hours. After completing the reaction, the autoclave was returned to conditions of room temperature and atmospheric pressure to obtain a slurry of pH 11.5 containing light yellow particles.

The particles thus obtained were filtrated out from the slurry, and were washed with pure water. Thereafter, the particles were subjected to analysis in the same manner as in Example 1, and were proved to be highly crystalline ceric oxide particles having an average particle size of 10.2μ.

Comparative Example 2

3.0 g of ceric hydroxide was dispersed in 80 g of pure water, and the aqueous solution thus obtained was adjusted to a pH of 10.0 with a 10% by weight sodium hydroxide aqueous solution. The aqueous solution thus obtained was placed in a Teflon-made 120 ml-autoclave, and was subjected to hydrothermal treatment at a temperature of 180° C. under a pressure of 10 kg/cm² for 15 hours. After completing the reaction, the autoclave was returned to conditions of room temperature and atmospheric pressure to obtain a slurry of pH 9.5 containing light yellow particles.

The particles thus obtained were filtrated out from the slurry, and were washed with pure water. Thereafter, the particles were analyzed in the same manner as in Example 1, and were proved to be highly crystalline ceric oxide particles having an average particle size of 8.0μ.

Comparative Example 3

43.3 g of cerous nitrate and 200 g of pure water were placed in a beaker, and were heated to boiling state with stirring. Thereafter, 29 g of 35% hydrogen peroxide was gradually added thereto without causing bumping to oxidize cerium (III) salt to cerium (IV) salt. The aqueous solution thus obtained was cooled, and 18 g of 28% aqueous ammonia was added thereto with stirring in such a manner as to be a molar ratio of $[NH_4OH]/[Ce^{4+}]=3$. In this manner, a slurry containing colloid-like precipitates of ammonium nitrate and cerium (IV) hydroxide in a molar ratio of $[NO_3]/[Ce^{4+}]=3$.

The colloid-like precipitates thus obtained were separated and washed with pure water. The colloid-like precipitates thus washed were redispersed, and the slurry thus obtained was adjusted to a pH of 5.0 with a dilute nitric acid. 85 g of the slurry was then placed in a Teflon-made 120 ml-autoclave, and was subjected to hydrothermal treatment at a temperature of 180° C. under a pressure of 10 kg/cm$^2$ for 15 hours. After completing the reaction, the autoclave was returned to conditions of room temperature and atmospheric pressure to obtain a slurry of pH 0.8 containing light yellow particles.

The particles thus obtained were filtered out from the slurry, and were washed with pure water. Thereafter, the particles were analyzed in the same manner as in Example 1 and were proved to be highly crystalline ceric oxide particles, having an average particle size of 0.02μ.

Comparative Example 4

The same procedure as in Example 3 was repeated, except that the hydrothermal treatment was conducted at a temperature of 80° C., thus producing a slurry of pH 9.2 containing light yellow particles.

The particles thus obtained were filtered out from the slurry, and were washed with pure water and were dried. The particles thus dried were subjected to powder X-ray diffraction analysis, and were proved to be ceric oxide particles of low crystallinity.

Comparative Example 5

15.0 g of cerous nitrate was dissolved in 70 g of pure water to obtain an aqueous solution of pH 3.8. The aqueous solution thus obtained was placed in a Teflon-made 120 ml-autoclave, and was subjected to hydrothermal treatment at a temperature of 200° C. under a pressure of 15 kg/cm$^2$ for 19 hours. After completing the reaction, the autoclave was returned to conditions of room temperature and atmospheric pressure to obtain a slurry of pH 1.3 containing white particles.

The particles thus obtained were filtered out from the slurry and were washed with water. Thereafter, the particles were analyzed in the same manner as in Example 1 and were proved to be highly crystalline ceric oxide particles having an average particle size of 8.3μ. However, the yield of the ceric oxide was very low, i.e. 3%.

Comparative Example 6

43.3 g of cerous nitrate was dissolved in 200 g of pure water in a beaker. The aqueous solution thus obtained was placed in a stainless steel-made 300 ml-autoclave, and was subjected to hydrothermal treatment at a temperature of 400° C. under a pressure of 300 kg/cm$^2$ for 1 hour to obtain a slurry of pH 0.8 containing light yellow particles.

The particles thus obtained were filtered out from the slurry and were washed with pure water. Thereafter, the particles were analyzed in the same manner as in Example 1 and were proved to be highly crystalline ceric oxide particles having an average particle size of 0.12μ. However, when the ceric oxide particles thus obtained were analyzed with respect to impurities, 0.46% of Fe and 0.13% of Cr to the weight of ceric oxide were detected.

Comparative Example 7

43.3 g of cerous nitrate and 200 g of pure water were placed in a beaker, and were heated to boiling state with stirring. Thereafter, 29 g of 35% hydrogen peroxide was gradually added thereto without causing bumping to oxidize cerium (III) salt to cerium (IV) salt. The aqueous solution thus obtained was cooled, and 6 g of 28% aqueous ammonia was added thereto with stirring in such a manner as to be a molar ratio of $[NH_4OH]/[Ce^{4+}]=1$ and to adjust the aqueous solution to a pH of 7.4. In this manner, a slurry containing colloid-like precipitates of ammonium nitrate and cerium (IV) hydroxide in a molar ratio of $[NO_3^-]/[Ce^{4+}]=3$ was obtained.

85 g of the, slurry thus obtained was placed in a Teflon-made 120 ml autoclave, and was subjected to hydrothermal treatment at a temperature of 150° C. under a pressure of 5 kg/cm$^2$ for 15 hours. After completing the reaction, the autoclave was returned to conditions of room temperature and atmospheric pressure to obtain a slurry of pH 1.4 containing light yellow particles.

The particles thus obtained were filtrated out from the slurry and were washed with pure water. Thereafter, the particles were analyzed in the same manner as in Example 1 and were proved to be highly crystalline ceric oxide particles having an average particle size of 0.48μ. However, the yield of the ceric oxide particles thus obtained was 38%. According to impurity analysis, no metal element other than cerium was detected.

As proved by the above Examples, when an aqueous medium containing ceric hydroxide and a nitrate is adjusted to a pH in the range of from 8 to 11 and is then subjected to hydrothermal reaction at a temperature in the range of from 100° to 200° C., highly crystalline ceric oxide particles of high purity having a particle size of from 0.03 to 5μ is obtained at a high yield.

On the other hand, when an aqueous medium containing ceric hydroxide and a nitrate is adjusted to a pH in the outside of the range of from 8 to 11, ceric oxide particles having a desired particle size can not be obtained. Also, when the hydrothermal treatment is conducted at a temperature of less than 100° C., highly crystalline ceric oxide particles can not be obtained, and when the hydrothermal treatment is conducted at a temperature exceeding 200° C., impurities are incorporated into ceric oxide particles due to corrosion of a reaction apparatus. Furthermore, when an aqueous medium containing ceric hydroxide only or an aqueous medium containing cerium nitrate only is used, particles having a desired particle size can not be obtained.

According to the present invention, ceric oxide particles can be obtained by subjecting an aqueous medium containing ceric hydroxide and a nitrate to hydrothermal reaction in an alkaline aqueous medium. In the present invention, this hydrothermal reaction provides highly crystalline ceric oxide particles at such a very low temperature as in the range of from 100° to 200° C. in an autoclave. Consequently, the process of the present invention can be carried out in such a simple and convenient apparatus as made of plastics or glass. Also, since the hydrothermal reaction temperature range used in the present invention does not require to use an autoclave made of a steel material such as stainless steel, there is no risk that metal impurities derived from corrosion of a steel material by a corrosive material under conditions of high temperature and high pressure are incorporated into a particle product. Thus, ceric oxide particles of high purity can be obtained, and these highly pure ceric oxide particles are suitable as an abrasive or polishing material used for production of semiconductors.

The highly crystalline ceric oxide particles of high purity obtained in the present invention can be widely used as an abrasive or polishing material for production of silicon semiconductors or compound semiconductors, electronic materials such as a silica insulating film or an organic resin film, quartz glass for optical fibers, lithium niobate for optical glass, ceramic materials such as rock crystal, aluminum nitrate, alumina, ferrite or zirconia, metal materials such as aluminum, copper, tungsten or their alloys, hard metal such as tungsten carbide, and the like.

Also, the crystalline ceric oxide particles obtained in the present invention can be used as an ultraviolet ray-absorbing material for UV ray-absorbing glass, UV ray-absorbing high molecular film, and the like, and are also useful for improving weather resistance of plastics.

What is claimed is:

1. A process for preparing cerium (IV) oxide particles having a particle size of from 0.03 μm to 5 μm, which comprises adjusting an aqueous medium containing cerium (IV) hydroxide and a nitrate to a pH of from 8 to 11 with an alkaline substance and heating the aqueous medium at a temperature of from 100° to 200° C. under pressure.

2. The process according to claim 1, wherein the cerium (IV) hydroxide and the nitrate are present in the aqueous medium at a molar ratio of $[NO_3]/[Ce^{4+}]$=from 1 to 6.

3. The process according to claim 1, wherein the nitrate is ammonium nitrate, sodium nitrate, potassium nitrate or a mixture thereof.

4. The process according to claim 2, wherein the nitrate is ammonium nitrate, sodium nitrate, potassium nitrate or a mixture thereof.

5. The process according to claim 1, wherein the alkaline substance is ammonia, sodium hydroxide, potassium hydroxide or a mixture thereof.

6. The process according to claim 2, wherein the alkaline substance is ammonia, sodium hydroxide, potassium hydroxide or a mixture thereof.

7. The process according to claim 3, wherein the alkaline substance is ammonia, sodium hydroxide, potassium hydroxide or a mixture thereof.

* * * * *